United States Patent Office
3,270,856
Patented Sept. 6, 1966

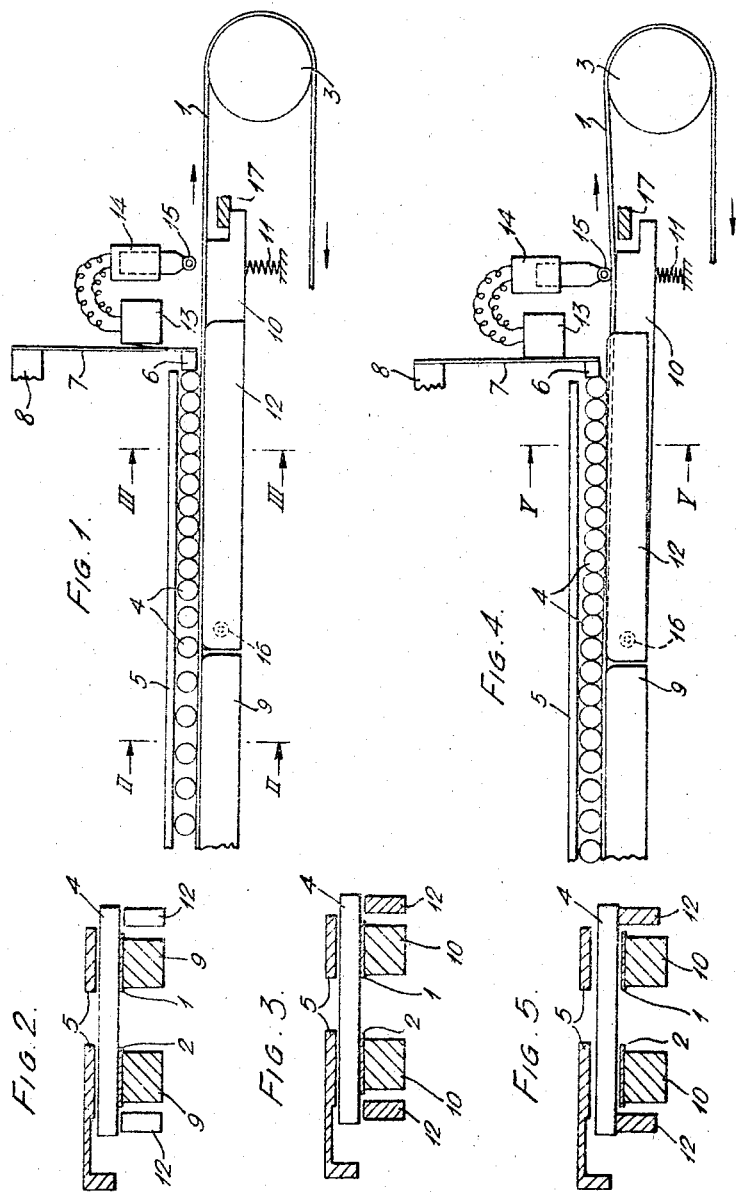
INVENTOR
GEORGE DEARSLEY

3,270,856
ARTICLE ASSEMBLING APPARATUS
George Dearsley, Richmond, Va., assignor to American Machine & Foundry Company, a corporation of New Jersey
Filed Jan. 28, 1964, Ser. No. 340,669
Claims priority, application Great Britain, Feb. 25, 1963, 7,525/63
9 Claims. (Cl. 198—31)

This invention relates to the treatment of articles moving on or being carried by a conveyor, and is particularly although not necessarily exclusively directed to the provision of new or improved apparatus for the treatment of articles of a fragile or crushable nature.

It is an object of the invention to provide means whereby a number of such articles may be arrested on a continually moving conveyor for some operation, such as for example their removal from the conveyor, to be performed on them.

If a stationary stop is introduced immediately downstream of an article on the conveyor the movement of that article will of course be arrested, as will that of succeeding articles as they pile up against one another. However, in such circumstances, the movement of the conveyor beneath them will still exert downstream forces on the articles, which forces will be exerted through them and will build up in dependance on the number of articles arrested. As a result the articles in the vicinity of the stop may be pressed against the latter and against each other with some force so that, if the articles are fragile, crushing or other damage may occur.

It is an object of the present invention to provide means whereby this difficulty may be overcome or considerably reduced.

Thus, according to the invention there is provided apparatus for arresting at least some of a stream of articles on a continuously moving conveyor, comprising stop means capable of arresting the flow of articles, means for causing relative separation of the conveyor surface and a number of adjacent articles upstream of such stop means, and means separate from the conveyor surface for supporting such articles out of engagement with such surface.

Thus, by causing separation of the conveyor surface and a number of articles upstream of the stop means, the downstream forces exerted on such articles by the conveyor are removed and compression of the article or articles towards the stop means is prevented.

The invention is particularly applicable to apparatus in which the object of arresting the articles on the conveyor is to enable them to be removed from the latter in batches by movement transverse to the direction of movement of the conveyor. In such apparatus it may be desired that each batch of articles should be in the form of a row of single article depth extending longitudinally of the conveyor and means may therefore be provided which are arranged to overlie the articles to be arrested, upstream of said stop means, so as to prevent their piling up one upon the other under the influence of succeeding articles. The presence of such overlying means has the effect of considerably increasing the pressure on articles near or adjacent the stop means as it transmits oblique forces, acting through the articles, back into the stream and thus increases the longitudinal force on the downstream articles, thus rendering the necessity for reducing such forces more desirable than ever.

Apparatus of this kind is disclosed in my copending U.S. patent application, Ser. No. 343,180. In such apparatus further stop means are provided upstream of the stop means already mentioned, such further stop means being movable into the stream to separate off a batch of articles downstream thereof, the downstream end one of which engages the first-mentioned stop means.

The number of articles, or the proportion of a batch of articles, which will be arranged to be separated from the conveyor surface in apparatus according to the invention will depend on a number of factors including the fragility of the articles, the number of articles in each batch, and the time for which it is desired to maintain the articles stationary on the conveyor whilst an operation is being performed on them. If the articles are not very fragile and it is only desired to arrest them for a short period of time, then it may only be necessary for a few articles adjacent the first-mentioned stop means to be disengaged from the conveyor. On the other hand if the articles are more fragile or each batch is large and they are to be arrested for a comparatively long time, then a large proportion or even all of the articles in the batch may be so disengaged.

Preferably, therefore, and in accordance with a further feature of the invention, means will be provided for sensing the pressure exerted on the said stop means by the articles and for producing a suitable signal when such pressure exceeds a predetermined minimum. In a preferred form of the invention the said sensing means is arranged to transmit a variable signal in dependance on the pressure on the said stop means. The said signal may be a visible one as a result of which an operator will be aware that the means for separating articles from the conveyor surface must be actuated; desirably, however, and in accordance with another feature of the invention, such signal is arranged to actuate such means automatically. In a preferred arrangement this automatic connection may be such that the number of articles separated from the conveyor is dependent on the pressure on the said stop means.

Alternatively, means may be provided for counting the articles as they move towards the stop means, such counting means being arranged to produce a signal when a number of articles which will exert a predetermined minimum pressure on the stop means has been arrested by the latter; here again such a signal may be a visible one or it may be arranged to cause automatic actuation of the means for separating articles from the conveyor surface.

The kind of conveyor to which the invention may most easily be applied is that which comprises one or more endless bands on which the articles are carried. The stop means may be of any suitable form and may be introduced from above the conveyor, or transversely from one or both sides thereof or, if the conveyor comprises two or more bands, from beneath it by being raised between the bands.

The means for supporting the articles out of engagement with the conveyor surface may conveniently comprise one or more bars or rails arranged longitudinally of the conveyor; in a preferred form a pair of relatively narrow bars or rails are positioned one on each side of the conveyor band or bands and are arranged to engage under the ends of articles lying across the conveyor. Alternatively, or in addition, where two or more conveyor bands are provided, such bars could be arranged between the bands.

The means for causing relative separation of articles and the conveyor surface may comprise means for depressing the latter to a level below the surface of the said supporting means so that the articles automatically come to rest thereon. Such depression may be effected by direct depression of a part of the conveyor surface, permitted by the resiliency of the conveyor band or bands, or by the depression of a conveyor supporting member or members lying beneath the conveyor and over which the latter runs.

Alternatively such separating means may comprise means for raising the said article supporting means so as to engage the articles and lift them from the conveyor surface, the level of the latter being unaffected. In yet another alternative, the article supporting means may be raised and the conveyor surface simultaneously lowered.

Where a movable support is provided underlying the conveyor, such support may be mounted for rectilinear vertical movement or, as in preferred form of the invention, may comprise an elongate member mounted for pivotal movement, about a horizontal axis transverse to the direction of movement of the conveyor, at its upstream end so that it and the conveyor may be lowered to a greater or lesser extent and thus separate articles from the conveyor over a variable length of the latter.

In order that the invention may be more readily understood, one embodiment of the same will now be described by way of example and with reference to the accompanying drawings, in which:

FIG. 1 is a diagrammatic side elevation of the apparatus;

FIG. 2 is a transverse cross-section on the line II—II of FIG 1;

FIG. 3 is a transverse cross-section on the line III—III of FIG. 1;

FIG. 4 is a view similar to FIG. 1 but showing the apparatus in a condition in which some of the articles have been separated from the conveyor surface; and FIG. 5 is a transverse cross-section on the line V—V of FIG. 4.

Referring to the drawings, FIG. 1 illustrates the position of the apparatus before sufficient articles have been arrested by the stop means to necessitate the separation of articles from the conveyor. The conveyor comprises a pair of endless flexible bands 1 and 2 mounted on wheels 3, only one of which is shown, by means of which the bands are driven in the direction indicated by the arrows.

The conveyor carries a continuous stream of articles 4, which in this case are cigarettes or rods of filter tip material, this particular embodiment of the invention being especially intended for the treatment of cigarettes or such rod like articles which have been manufactured in apparatus situated upstream of the conveyor and which are now required to be halted in batches on the conveyor for removal therefrom, for example for transfer to trays in which they are to be stored. The illustrated apparatus is particularly intended for incorporation in apparatus of the kind described in aforementioned copending application, which includes means for sweeping batches of cigarettes or rod like articles from the conveyor in a direction parallel to their axes, and further means situated upstream of the illustrated apparatus for cutting off the supply of cigarettes when the desired number constituting a single batch has been fed past such means.

A pair of bars 5 overlie the cigarettes 4 to prevent their piling up one upon the other under the influence of stop means 6 mounted on a spring strip 7 which is secured to a fixed member 8.

The upstream parts of the conveyor bands 1 and 2 are supported on fixed bars 9, whilst the downstream parts thereof are supported on further bars 10 which are pivotally mounted near to their upstream ends at 16 for movement about a common horizontal axis transverse to the length of the conveyor. At their downstream ends the bars 10 are acted upon by compression springs 11 which urge them against stops 17, in which positions they maintain the conveyor bands in a level condition.

A further pair of fixed rails 12, narrower than the bars 11, are arranged one on each side of the latter and constitute support means for the cigarettes for use when the latter are separated from the conveyor.

In the condition of the apparatus shown in FIG. 1 a sufficient number of cigarettes has not yet built up upstream of the stop means 6 to cause crushing of the articles adjacent the latter. When more cigarettes join the batch, however, as shown in FIG. 4, the pressure on the stop means increases above a predetermined level so as to cause the latter to move to the right to an extent sufficient to operate a microswitch 13 which controls a solenoid 14 to cause a head 15 carried thereby to be urged downwardly into engagement with a bridge piece (not shown) joining the downstream ends of bars 10. As a result the bars 10 are swung about their pivots 16 and the conveyor bands 1 and 2 lowered so that the cigarettes at the downstream end of the batch are lowered until their ends become supported on the rails 12 (see FIG. 5) and the downstream forces exerted on them by the bands 1 and 2 are thereby removed. The electrical circuit is conventionally arranged for the head 15 of solenoid 14 to maintain the bars 10 in their lowered positions as long as microswitch 13 is closed, or for as long as is required thereafter by incorporating a conventional relay or time delay in the microswitch. The downstream pressure in the batch of cigarettes is thus reduced sufficiently to remove any danger of the cigarettes adjacent stop 6 being crushed.

In the illustrated apparatus the cigarettes will be swept from the conveyor shortly after the condition illustrated in FIG. 4 is achieved, and their places subsequently taken by a succeeding batch after bars 10 have been restored to their level condition as seen in FIG. 1 so that the above-described cycle of events may be repeated.

In a modification of the illustrated apparatus the degree of depression of the bars 10 by the head 15 could be made dependent on the pressure exerted by the cigarettes on stop 6 by employing a suitable transducer in place of the microswitch 13, so that the number of cigarettes separated from the conveyor, and the consequent reduction in pressure on stop 6, is dependent on the pressure exerted thereon.

In another modification the solenoid 14 could be operated by cigarette counting means situated upstream of the illustrated apparatus when a predetermined number of cigarettes in each batch have passed such counting means. Again, if it is desired to collect large batches of articles necessitating the provision of very long bands 1 and 2, a series of pivotally mounted bars 10 may be provided, such bars being arranged to be depressed one after the other in response to such counting means, so that a batch of articles of very great length may be collected without any of them being subjected to pressure in excess of a predetermined amount.

In some circumstances, and particularly where the conveyor 1 is formed of comparatively strong material such as one or more rubber belts, it may not be necessary to provide bars 10 to support it over the downstream part of its length, the belt or belts being mounted tightly enough as normally to maintain a level position. The head 15 of the solenoid 14 could then be formed as a roller and arranged to bear directly on the conveyor so as to depress the latter at a given signal, subsequent raising of the head permitting the conveyor belt to return to its level condition under its own resilience.

It is to be understood that although a preferred embodiment of the invention has been described with reference to the treatment of cigarettes and rods of filter tip material, the invention is applicable to the treatment of all manner of fragile articles when it is desired to arrest them on a continuously moving conveyor, such as glass articles (e.g. electric valves or bulbs), fuses, confectionery such as soft cakes and chocolates, and other articles which may easily be crushed.

What is claimed is:

1. In a continuously moving conveyor, apparatus for conveying a stream of articles and for arresting at least part of the conveyed stream or articles, comprising support means pivotally mounted on a horizontal axis at one end and yieldably supported at the other end, endless movable member means for conveying a stream of articles thereon and being supported at least in part by the support means, rail means, extending along and parallel to said endless member, stop means adjacent the downstream end of the endless member means for arresting articles being conveyed, sensing means adjacent the stop means for sensing the number of conveyed articles arrested by the stop means, and actuating means responsive to the sensing means for urging the support means about its pivotally mounted end to disengage the endless member means from a number of adjacent conveyed articles upstream of the stop means.

2. The apparatus according to claim 1, wherein the rail means comprise a rail on the opposite sides, extending along, and parallel to the said endless member from one of the sides of the conveyer member means.

3. The apparatus according to claim 1, further comprising a stop, and spring means for biasing the support means about its pivotally supported end into engagement with the stop in a position supporting the endless member means for conveying articles, the actuating means urging the support means away from the stop and against the spring means when disengaging the endless member means from conveyed articles arrested by the stop means.

4. The apparatus according to claim 1, wherein the actuating means engages the endless member means downstream from the stop means displacing the endless member means and urging the support means about its pivotally mounted end for disengaging the endless member means from arrested conveyed articles.

5. The apparatus according to claim 1, further comprising a pair of fixed coextensive support members disposed in spaced parallel relationship with one another, the support means being a pair of coextensive support members pivotally connected to the ends of the fixed support members at the pivotally mounted end of the support means, and the endless member means being a pair of endless conveyor belts disposed in spaced parallel relationship and driven in unison with one another, the fixed support members and the support members pivotally connected thereto providing support for the endless belts which extends downstream from the stop means.

6. The apparatus according to claim 1, wherein the sensing means is operable in response to the force on the stop means by the arrested articles for providing a signal when such force exceeds a predetermined minimum, and the actuating means urging the support means about its pivotally mounted end in response to the signal from the sensing means.

7. The apparatus according to claim 6, wherein the signal provided by the sensing means is variable in accordance with the force exerted on the stop means so the number of articles disengaged by the endless member means is proportional to and varies in accordance with the number of articles exerting a force on the stop means.

8. The apparatus according to claim 1, wherein the sensing means being a counter means disposed upstream from the stop means for counting articles conveyed to the stop means and for providing a signal when a predetermined number of conveyed articles have been counted, and the actuating means urging the support means about its pivotally mounted end in response to the signal from the counter means.

9. The apparatus according to claim 8, wherein thle signal provided by the counter means is variable in accordance with the number of counted conveyed articles so the number of articles disengaged by the endless member means is proportional to and varies in accordance with the number of articles arrested by the stop means.

References Cited by the Examiner
UNITED STATES PATENTS

| | | | |
|---|---|---|---|
| 2,690,832 | 10/1954 | Salter | 198—34 |
| 3,081,861 | 3/1963 | Plach | 198—40 |
| 3,116,823 | 1/1964 | Schneider | 198—160 |

EVON C. BLUNK, *Primary Examiner.*

RICHARD E. AEGERTER, *Examiner.*